United States Patent [19]

Tanaka et al.

[11] Patent Number: 5,510,976
[45] Date of Patent: Apr. 23, 1996

[54] CONTROL SYSTEM

[75] Inventors: Naoki Tanaka, Tokyo; Hiroshi Okamoto, Ome; Masayoshi Naito, Kawagoe; Shin-ichiro Umemura, Hachioji; Yasuo Morooka; Masahiro Kayama, both of Hitachi; Hiroaki Okudaira, Yokohama, all of Japan

[73] Assignee: Hitachi, Ltd., Tokyo, Japan

[21] Appl. No.: 194,378

[22] Filed: Feb. 8, 1994

[30] Foreign Application Priority Data

Feb. 8, 1993 [JP] Japan .................................. 5-019886

[51] Int. Cl.$^6$ ............................ C05B 13/02; G06F 15/18
[52] U.S. Cl. ......................... 364/148; 364/176; 364/165; 364/194; 395/21; 395/903
[58] Field of Search ...................... 364/148, 152, 364/176, 194, 183, 164, 165; 318/561; 395/21, 903, 906

[56] References Cited

U.S. PATENT DOCUMENTS

| | | | |
|---|---|---|---|
| 5,045,713 | 9/1991 | Shima | 307/201 |
| 5,323,471 | 6/1994 | Hayashi | 382/15 |

OTHER PUBLICATIONS

Ott—"Controlling Chaos"—Physical Review Letters—12 Mar. 1990—pp. 1196–1199.
Shinbrot et al—"Using Chaos to Direct Trajectories to Targets"—24 Dec. 1990—pp. 3215–3218.
Peng et al—"Controlling Chemical Chaos"—J. Phys. Chem. 1991—pp. 4957–4959.
Rhode et al, "Adaptive Learning to Control Chaos", IEEE/IEE Publications Ondisc, System Theory, 1994 Southeastern Symposium.
Faramarz et al, "Criteria for Chaos in Adaptive Control", IEEE/IEE Pub. Ondisc, Circuits and Systems, 1989 IEEE Midwest Symposium.
Freeland et al, "Multipredictor Modeling with Application in Chaotic Signals", IEEE/IEE Pub. Ondisc, ICASSP '93: Acoustic Speech & Signal Process Conference.
Haralobos et al, "Optimal Detection of a Class of Chaotic Signals", IEEE/IEE Pub. Ondisc, ICASSP '93: Acoustic Speech & Signal Process. Conference.
Li et al, "Chaotic Detection of Small Target in Sea Clutter", IEEE/IEE Pub. Ondisc, ICASSP '93: Acoustics Speech & Signal Process Conference.
Sanchez, "Soft Computing Perspectives", IEEE/IEE Pub. Ondisc, Multiple–Valued Logic, 1994, 24th International Symposium.

*Primary Examiner*—Joseph Ruggiero
*Attorney, Agent, or Firm*—Antonelli, Terry, Stout & Kraus

[57] ABSTRACT

A control system is for accelerating stabilization of a chaotic state of a controlled system into a desired periodic state. In the control system, the SOGY algorithm is extended to permit selection of a region on a chaotic attractor as a target, so that the SOGY algorithm can be successfully combined with the OGY algorithm for the purpose of stabilization of the controlled system in the periodic state. Also, the method of nonlinear prediction is introduced so as to secure the effectiveness of the SOGY algorithm. Further, an uncertainty of prediction is taken into consideration so as to eliminate unnecessary control and to improve the effectiveness of the SOGY algorithm.

24 Claims, 9 Drawing Sheets

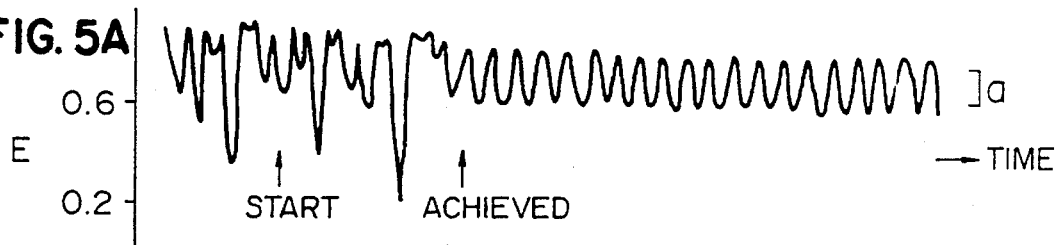
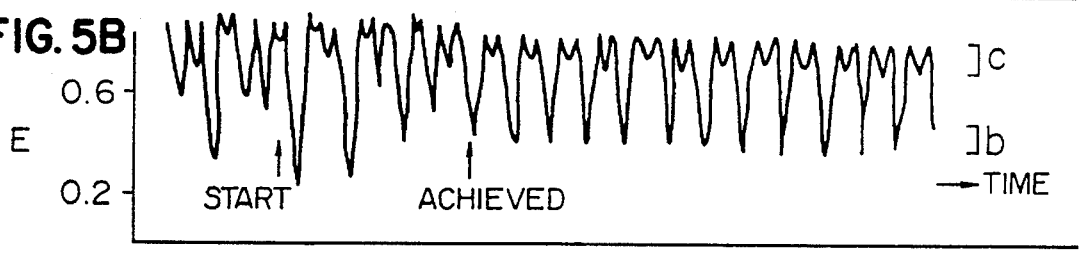
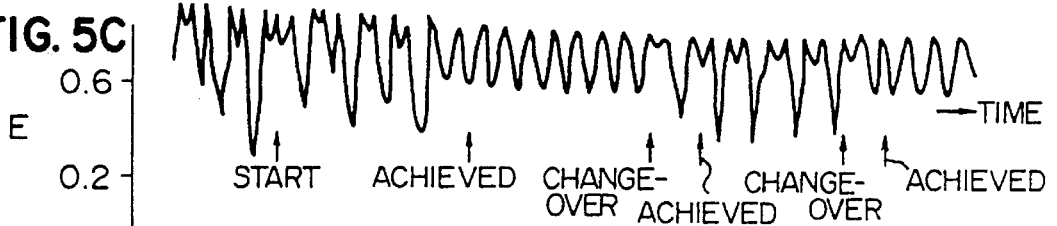
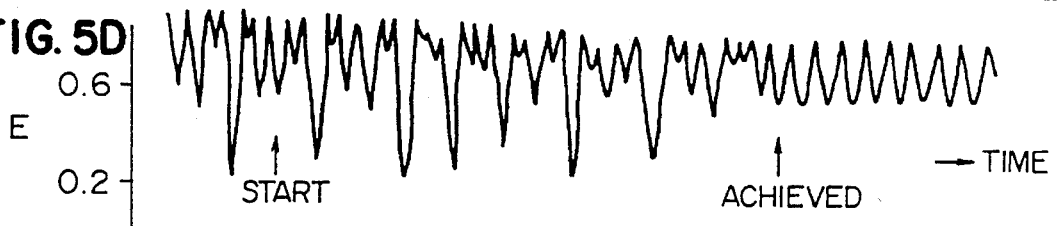
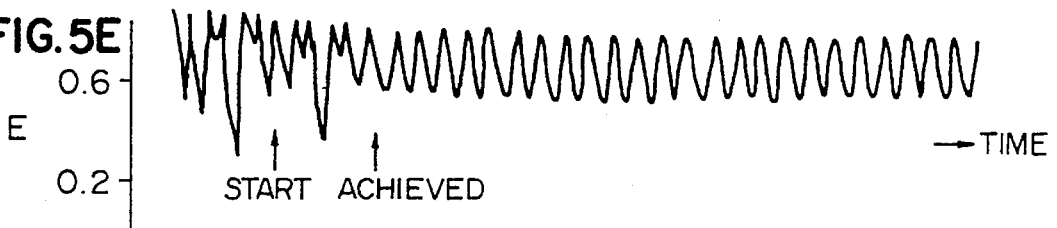

CONTROL SYSTEM

BACKGROUND OF THE INVENTION

This invention relates to a control system which utilizes the state of chaos and can be widely applied to the automatic control of a system exhibiting a chaotic behavior.

The manner of control based on the OGY algorithm or the SOGY algorithm is one form of control technology utilizing chaos. The OGY algorithm refers to an algorithm in which, when a system to be controlled is located in the neighborhood of an unstable periodic point on the Poincaré surface of section in the phase space, a tiny perturbation is applied to the system so that the system can be stabilized at this periodic point. (Refer to, for example, Phys. Rev. Lett., 64, 1196–1199 (1990)). The periodic point referred to above is a point where the orbit of the system in its periodic state pierces the Poincaré surface of section. The OGY algorithm assumes that the Poincaré map is linearly dependent on the control parameter p. Therefore, the control parameter p can be adjusted in a finite region $I_p$ expressed as $I_p$ (=$[p_{min}, p_{max}]$, that is, $p_{min} \leq p \leq p_{max}$). As a result, in order that the OGY algorithm can effectively work, a restriction is imposed according to which the system must lie within a certain region $I_t$. On the other hand, the SOGY algorithm is such that a tiny perturbation is applied to the system so that the state of the system can be quickly shifted toward a desired state (a target) on the orbit of chaos. (Refer to, for example, Phy. Rev. Lett., 65, 3215–3218 (1990)).

It was considered hitherto that the combination of the OGY algorithm and the SOGY algorithm could attain the purpose of desired quick control. (Refer to, for example, J. Phys. Chem., 95, 4957–4959 (1991)).

SUMMARY OF THE INVENTION

However, how to combine the OGY algorithm and the SOGY algorithm was not concretely clarified yet. Also, there were problems including how to secure the effectiveness of the SOGY algorithm itself.

In the original form of the SOGY algorithm, the target was a point in the phase space. Thus, the desired matching between the SOGY algorithm and the OGY algorithm could not be satisfactorily achieved. Therefore, in the present invention, the SOGY algorithm is extended to deal with the case where the target is the region $I_t$. Because of such an extension, the OGY algorithm and the SOGY algorithm can be satisfactorily effectively combined.

Further, because the SOGY algorithm is a control algorithm of feedforward type, its practical application requires information regarding the future of the system. The required information can be easily obtained if the rule of dynamics is already known, which is shown in the paper cited above. However, the case where the rule of dynamics is already known is rather rare as a matter of fact.

Therefore, the present invention utilizes nonlinear prediction methods for the purpose of acquiring the information regarding the future of the system. That is, a considerably large number of past output data of the system are stored so as to construct a chaotic attractor by means of embedding. On the basis of the chaotic attractor thus obtained, the features are extracted so as to estimate future values (future states). Practical methods include nonparametric local approximation of zeroth order or first order, parametric global or local approximation and use of a neural network model. The parametric global approximation includes an expansion of a polynomials or an expansion of a radial basis function, while the parametric local approximation includes an expansion of a polynomials.

In view of the character of the SOGY algorithm, the prediction should desirably be done as accurate as possible. In the case of time delay coordinates usually used in this field, the reliability of the prediction can be improved by the use of the method for calculating distances while taking into consideration uncertainties tending to be included in the coordinate components. By the utilization of such an improved method for the prediction, the effectiveness of the control itself can be improved.

The desired extension of the SOGY algorithm to deal with the case where the target is the region $I_t$ can be achieved in a manner which will be described now. It is supposed that $\xi_i$ represents the value of the state variable on the Poincaré surface of section in the phase space, and i means the coordinate on the Poincaré surface of section met at the i-th time. When the parameter p can be freely varied within the range $I_p$, and $\xi_0$ is the present value of the state variable, $\xi_k$ that is the value of the state variable after k steps lies within a certain region $I_k$. Then, the region $I_k$ is estimated by, for example, the nonlinear prediction method, and a minimum value n where the regions $I_t$ and $I_k$ partly overlap each other is calculated. This minimum value n is given by the following equation (1):

$$n = \min(k; I_k \cap I_t \neq \emptyset, k=1, 2, 3, \ldots) \quad (1)$$

Thus, when the parameter p whose present value is $p_o$ is adjusted within the region $I_p$ so that the value of $\xi_n$ can be included within the region $I_t$, the value $\delta_p$ for modifying the parameter p can be calculated in a manner as will be described now. A parameter region corresponding to the overlapping part of the regions $I_t$ and $I_n$ is sought, and a parameter p* corresponding to the center of the region is determined as the modified parameter. The value for modifying the parameter is given by $\delta_p = p^* - p_O$. It is the basic concept of the present invention that the SOGY algorithm is extended in the manner described above so that it can be combined with the OGY algorithm.

In the case of the prediction using the time delay coordinates, the reliability of the prediction can be improved by the use of the method for calculating distances while taking into consideration uncertainties tending to be included in the coordinate components. The reason will now be described. In the case of the nonlinear prediction using a local approximation method, the chaotic attractor is constructed on the basis of past data $\{x_{-i}\}$, and a future value $x_k$ is estimated on the basis of the behavior of a point closely adjacent to a point $X_O$ corresponding to the present value $x_O$. The Euclidean distance is commonly used for this estimation. However, in the case where the time delay coordinates are used for this purpose, data taken at different times are used to express the coordinates of one point. Thus, different uncertainties are included in the individual coordinate components respectively. When a point $X_{-i}$ lies within d-dimensional time delay coordinates space, this point $X_{-i}$ is actually expressed as follows:

$$X_{-i} = (X_{-i}, X_{-i-\tau}, X_{-i-2\tau}, \ldots, X_{-i-(m-1)\tau}, \ldots,$$

$$X_{-i-(d-2)\tau}, X_{-i-(d-1)\tau})$$

In the above expression, $\tau$ is the delay time. Suppose that $\epsilon_O$ represents an uncertainty included in the value of the point $x_{-i}$. Then, the uncertainty $\epsilon$ included in the value of $x_{-i-(m-1)\tau}$ is related with the maximal absolute value of Lyapunov exponents, and the following expressions hold:

$$\epsilon \sim \epsilon_0 \exp[K(m-1)\tau],$$

$$K \sim max(|\lambda_j|; j = 1, 2, 3, \ldots, d)$$

In the above expressions, $\lambda_j$ is a Lyapunov exponent. Therefore, the desired prediction can be more accurately made when a distance calculation formula in which individual components are weighted by a factor of $1/\epsilon$, for example, the following formula:

$$\|X_{-i} - X_0\| = \sqrt{\sum_{m=1}^{d} [X_{-i-(m-1)\tau} - X_{-(m-1)\tau}]^2 e^{-2K(m-1)\tau}} \quad (2)$$

is used for the calculation of the distances. In the above case, the Euclidean norm is used by way of example. It is apparent, however, that any other suitable norm, for example, the maximum norm may be used.

FIGS. 1A and 1B show, by way of example, the results of prediction by the use of the distance calculation formula described above. In FIGS. 1A and 1B, the prediction based on nonparametric local approximation of zeroth order is made on the chaos time series producing a He'non map so as to seek the coefficient of correlation between the predicted values and the actual values. FIG. 1A represents the case where the conventional Euclidean norm is used, while FIG. 1B represents the case where the above formula for calculating distances is used. It will be seen in FIG. 1B that, except the case where d=1, undesirable fluctuation of the coefficient of correlation due to the dimension d almost disappears. It will be also seen that, in the case of the prediction step 1, the value of the correlation coefficient in FIG. 1B is 0.999965, whereas that value in FIG. 1A is 0.999891. This means that the accuracy in the case of FIG. 1B is improved to about three times as high as that in the case of FIG. 1A. Both the nonparametric local approximation of first order and the parametric local approximation of first order can exhibit similar improvements. Thus, the prediction using the above formula provides more accurate predicted values.

BRIEF DESCRIPTION OF THE DRAWINGS

FIGS. 5A–5E show potential variations corresponding to the plated alloy layers shown in FIGS. 4A–4E.

DESCRIPTION OF THE PREFERRED EMBODIMENTS

The present invention will now be described by reference to its application to a control system controlling an alloy plating system. The alloy plating system under consideration is classified into a galvanostatic type and a potentiostatic type. In the alloy plating system, the component ratio distribution and the plated layer thickness are given as the target values. The prior art manner of control is sufficiently effectively applicable for the purpose of controlling the plated layer thickness. Therefore, the control of the component ratio distribution will be mainly discussed herein. Metal ions in a plating solution are deposited faster when the potential of an electrode is lower than the redox potential of the metal itself. Accordingly, when the potential of the electrode varies periodically, the component ratio of the plated layer varies periodically in the thicknesswise direction of the plated layer. On the other hand, when the electrode potential is maintained constant, the component ratio is also maintained constant. Therefore, by controlling the electrode potential, the component ratio distribution can be controlled.

(1) Galvanostatic type alloy plating control system

Figure 1A:
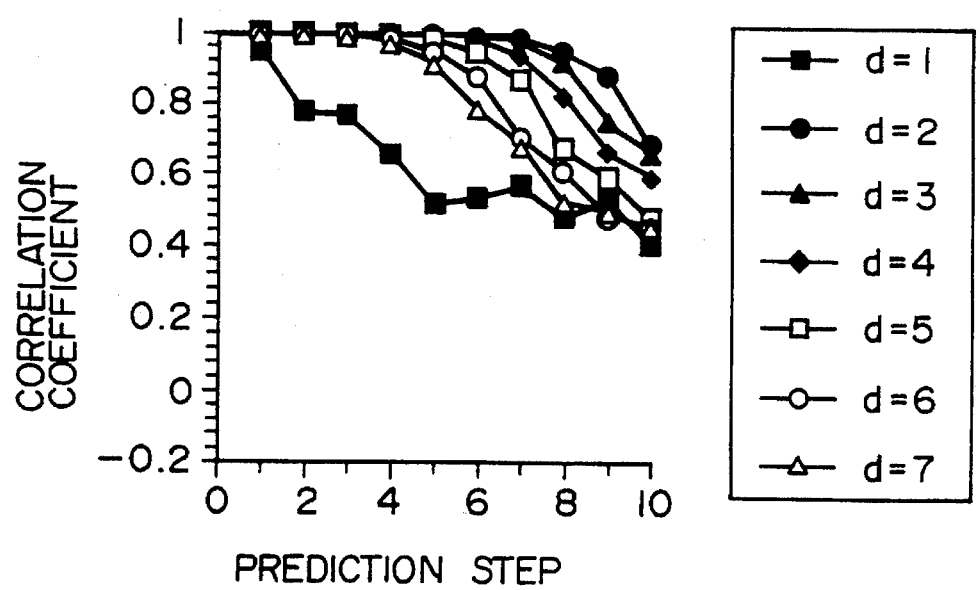
FIGS. 1A and 1B show the results of prediction by the use of a formula for calculating distances while taking into consideration an uncertainty included in coordinate components.
Figure 1B:
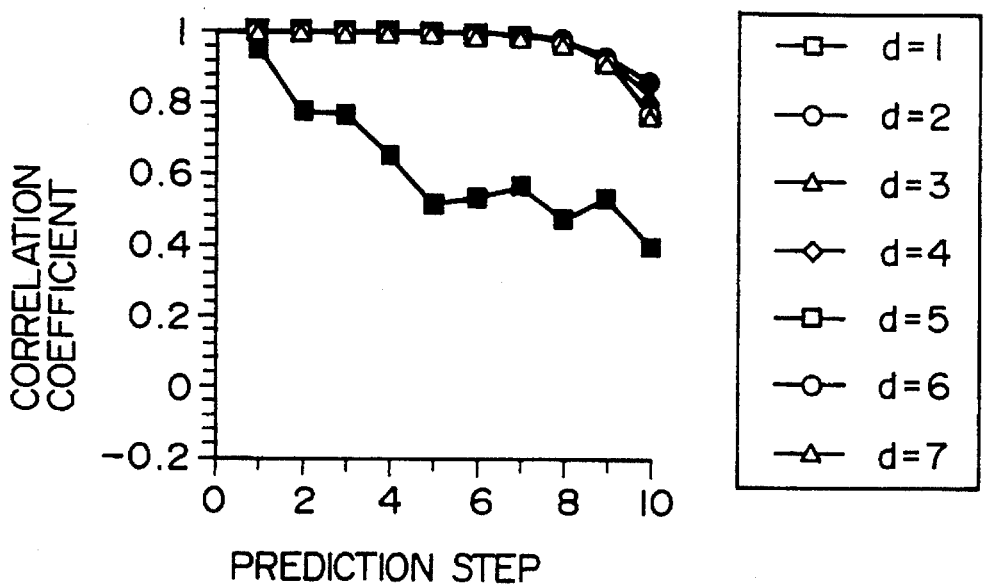
Figure 2:
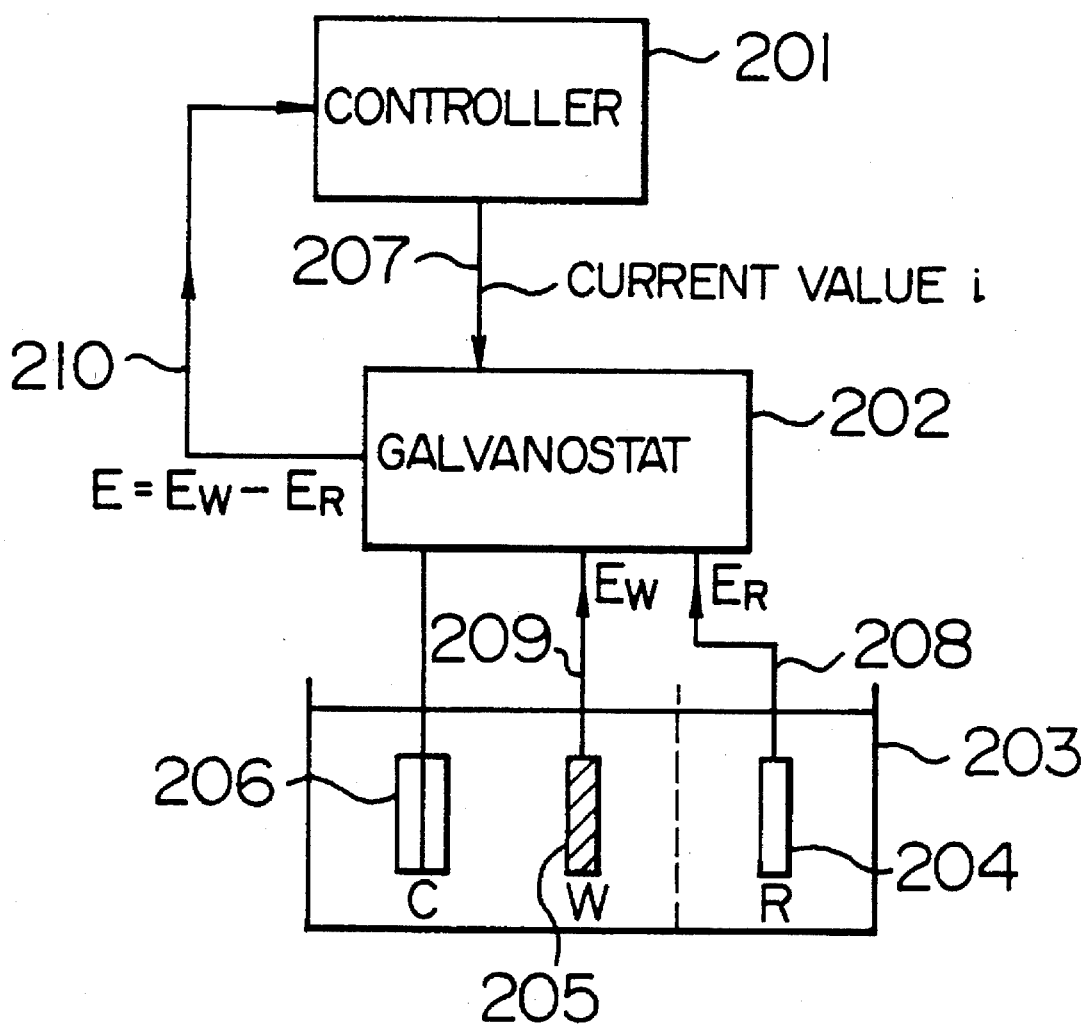
FIG. 2 shows the structure of an embodiment of the present invention applied to the control of a galvanostatic type alloy plating system in which the working electrode potential is monitored.

FIG. 2 shows the structure of a galvanostatic type alloy plating control system which is an embodiment of the present invention. Referring to FIG. 2, a controller 201 controls a galvanostatic type alloy plating apparatus composed of a galvanostat 202 and an electrolytic vessel 203. The electrolytic vessel 203 includes in its interior a reference electrode 204, a working electrode 205 and a counter electrode 206 formed of metal components of an alloy. The interior of the electrolytic vessel 203 is filled with an electrolytic solution containing metal ions of the alloy components. The alloy plating process preceeds in such a manner that the metal of the counter electrode 206 is dissolved and deposited on the working electrode 205. In this case, a current having a value i set by the controller 201 flows across the working electrode 205 and the counter electrode 206. The potential $E = E_W - E_R$ of the working electrode 205 relative to that of the reference electrode 204 varies with the change of the electrode surface state. This potential E is supplied to the controller 201 through the galvanostat 202. In the illustrated form, the current value i is slightly changed when the potential of the working electrode 205 chaotically oscillates, thereby providing the desired periodic potential variation. An infinite number of unstable periodic states exist in the neighborhood of the chaotic state. When one of these unstable periodic states appears as the potential of the working electrode 205, it provides one component ratio distribution. The correspondence between these unstable periodic points and the component ratio distributions can be known beforehand from the analysis of the Poincaré surface of section. A control algorithm for acceleration of converting the chaotic state to the desired periodic state is as shown in FIG. 3.

Figure 3:
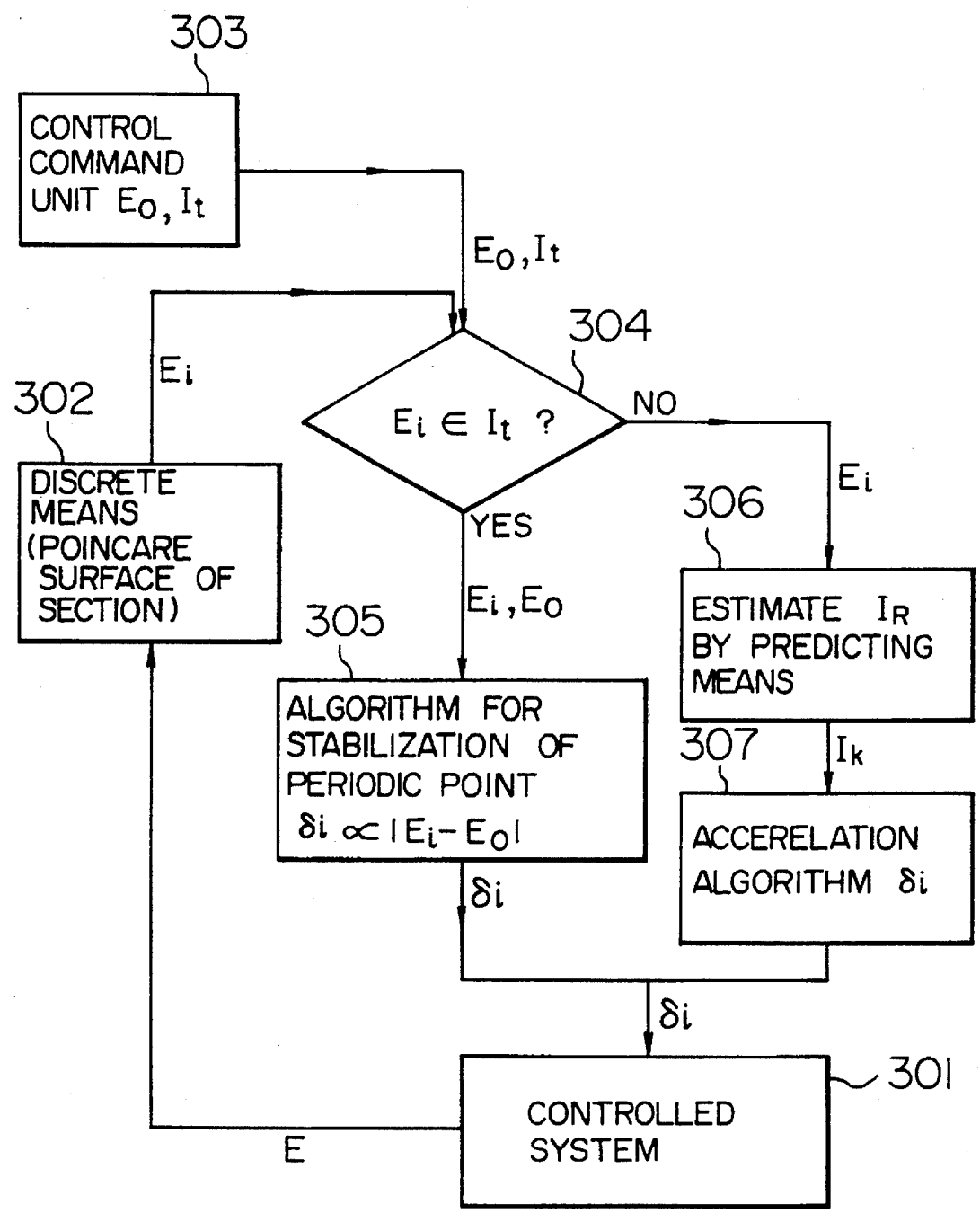
FIG. 3 is a block diagram showing the sequence of control in the system shown in FIG. 2.

Referring to FIG. 3, the potential E which is the output from the controlled system (the galvanostat 202 and the electrolytic vessel 203) appears in a step 301. This potential E is sampled in a step 302 on the Poincaré surface of section by a discretizing means to provide a discrete potential $E_i$ which is hereafter regarded as the output from the controlled system. The periodic point to be stabilized is specified to specify the component ratio distribution. Thus, the potential range $I_t=[E_{min}, E_{max}]$ where the periodic point can be stabilized is determined. Then, in a step 303, a control command unit supplies a representative potential $E_O$ of the desired periodic point and supplies also the range $I_t$ to a decision step 304. When the result of decision in the step 304 is YES, the step 304 is followed by a step 305 in which an algorithm is used for the stabilization of the periodic state specified by $E_O$ and $I_t$. The potential $E_i$ varies chaotically while maintaining the current value $i=i_O$ supplied before the control is started. The current value i is adjusted in a range of $[i_O-\Delta i, i_O+\Delta i]$, and the control proceeds in a manner as will be described now.

When the decision made in the step 304 proves that the potential $E_i$ is included within the potential range It, the control for the purpose of acceleration of conversion is unnecessary, and, according to the stabilization algorithm used in the step 305, the current value i is modified so that the stabilization at the desired periodic point can be achieved in the next step. The stabilization can be achieved by adding a modifying value $\delta_i$ proportional to the deviation Ei from the representative potential $E_O$ of the periodic point.

When the decision made in the step 304 proves that the potential $E_i$ is not included in the potential range $I_t$, the potential $E_{i+k}$ is predicted. That is, a potential range $I_k$ after k steps after the current value i is changed to lie in the range $[i_O-\Delta i, i_O+\Delta i]$ is estimated by a predicting means in a step 306. Then, in a step 307, an algorithm for acceleration is used to find the modifying value $\delta_i$. When an overlap between the ranges $I_n$ and $I_t$ is first detected, the potential $E_i$ can be shifted into the region $I_t$ after n steps by adjusting the modifying value $\delta_i$. As a result, the algorithm for stabilization becomes effective after the n steps, so that the potential $E_i$ can be stabilized at the desired periodic point in the next step. The OGY and SOGY algorithms are used as the algorithms for stabilization and acceleration respectively.

Figure 4A:
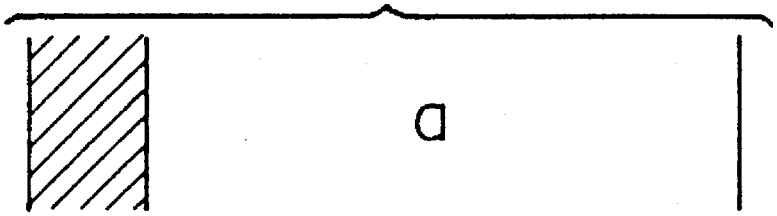
FIGS. 4A–4E are a schematic sectional views of the plated alloy layers.
Figure 4B:
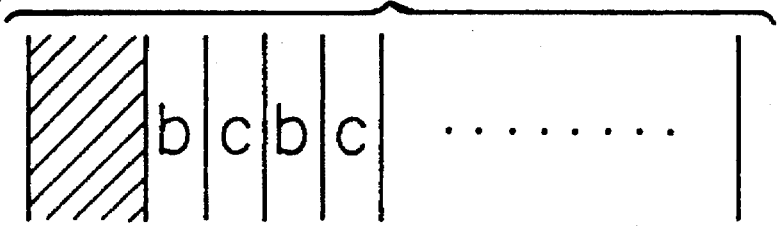
Figure 4C:
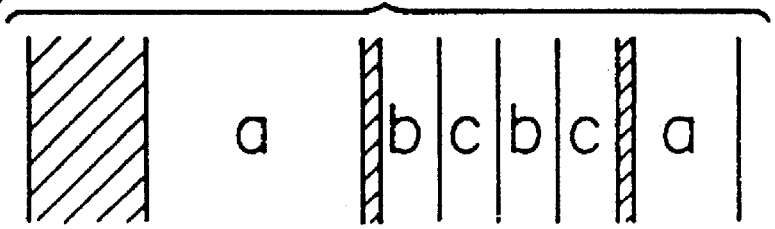
Figure 4D:
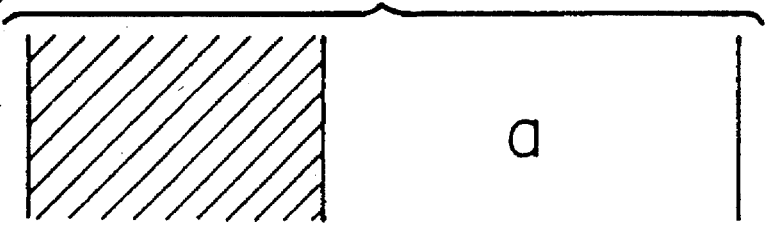
Figure 4E:
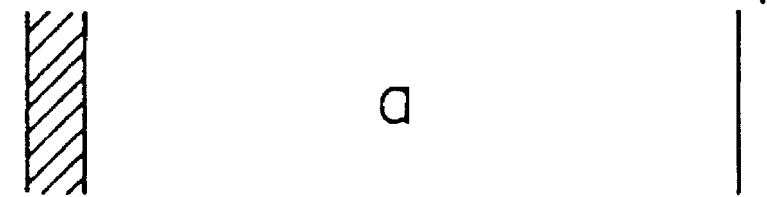

The result of application of the present invention to a Cu-Ag alloy plating system will now be described. In this plating system, the potential E showed a chaotic variation at a current value of 1.25 mA. The potential E was controlled while adjusting the current value i within the range of [1.2, 1.3] mA. The parametric local approximation of first order was used for the prediction, and 2,000 points for each of i=1.2 mA, i=1.25 mA and i=1.3 mA were used as past data. As a result, plated alloy layers as shown in FIGS. 4A–4E respectively could be obtained. FIGS. 5A–5E show corresponding variations respectively of the potential E in the plating process. In FIGS. 5A–5E, the arrows "start" and "end" indicate application of a new control command and attainment of the target of control respectively. Further, the arrow "change-over" in FIG. 5C indicates that change-over of the period of the periodic control is instructed. FIG. 4A shows the case of the control with the sequence: chaos + period-1, FIG. 4B the case of the control with the sequence: chaos→ period-2, and FIG. 4C the case of the control with the sequence: chaos→period-1→period-2→period-1→. . . → period-2. In FIGS. 4A–4E, the symbols a, b and c designate that the component ratio distributions are different from one another. That is, the symbols a, b and c indicate that the components ratios of Cu and Ag distributed in the plated alloy layers are different from one another. These correspond to deposition in potential ranges a, b and c in FIGS. 5A–5E respectively. Hatchings in FIGS. 4A–4E correspond to transient states from the chaotic states to the periodic states. In these cases, substantially averaged component ratio distribution could be obtained. FIG. 4D shows the result of prediction in the case where the control according to the sequence: chaos→period-1 is carried out without relying on the SOGY algorithm. Also, FIG. 4E shows the result of prediction in the case where the control according to the sequence: chaos→period-1 is carried out while utilizing the distance calculation formula taking into consideration uncertainties included in the coordinate components. FIGS. 5D–5E show the potential variations corresponding to the cases of FIGS. 4D–4E respectively.

When the manner of control is changed, the time during the transient state also changes, and the thickness of each hatching changes correspondingly. These facts have clarified that:

i) the component ratio distribution can be changed by changing the period;

ii) the SOGY algorithm effectively works to reduce the part corresponding to the transient state; and iii) by making the prediction utilizing the distance calculation formula taking into consideration the uncertainty included in the coordinate components, the part corresponding to the transient state can be further reduced.

Also, even when the state corresponding to the same period is utilized, the components ratio distribution can be changed by changing the position of the Poincaré surface of section used for the control. As a result, an almost infinite number of variations can be obtained.

Figure 6:
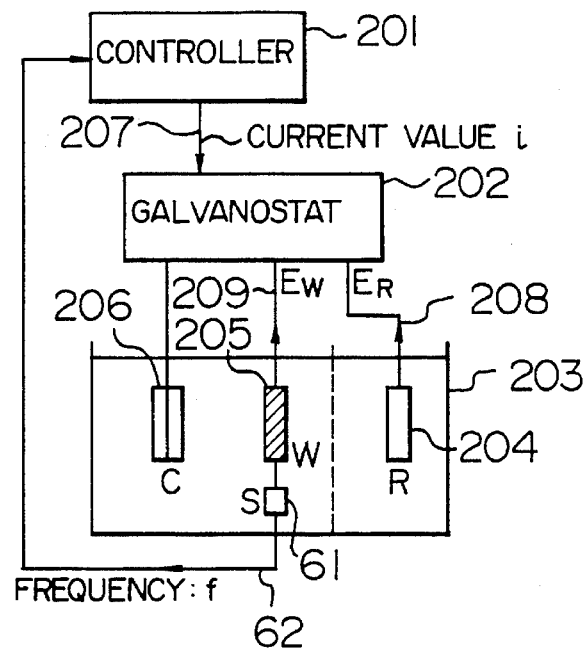
FIG. 6 shows the structure of another embodiment of the present invention applied to the control of a galvanostatic type alloy plating system in which the signal from a crystal oscillator is monitored.

In the first embodiment described above, the potential is directly monitored. However, a sensor in the form of a crystal oscillator may be used to monitor the frequency. FIG. 6 shows the structure of such a modification. Referring to FIG. 6, the crystal oscillator sensor 61 is so designed that the potential of an electrode attached to its surface is the same as that of the working electrode 205. The system shown in FIG. 6 differs from the system shown in FIG. 2 in that the frequency f 62 is monitored in lieu of the potential E. Because the frequency of the crystal oscillator 61 depends on the mass of the deposited metal, the change of the frequency with the time directly reflects the component ratio of the alloy. Accordingly, the effect is the same as that of monitoring the potential E. Further, when the component ratio distribution of the alloy deposited on the surface of the working electrode 205 deviates from the ideal component ratio distribution estimated from the potential E, the system shown in FIG. 6 is excellent over the system shown in FIG. 2 in that the metal deposited on the surface of the working electrode 205 can be directly monitored.

The thickness of the plated alloy layer is so controlled that the plating process is ended when the result of monitoring the amount of the supplied current attains the target value. When it is desired to deposit an alloy layer of multilayer film by plating, the operator inputs, for example, the total thickness of the alloy layer of multilayer structure and the type of finish as shown in FIGS. 4A–4E. The above information is supplied to a microcomputer which automatically determines the sequence of the periodic state and the layer thickness corresponding to the components to be formed. Thus, according to this sequence, the periodic state can be changed over by the prior art method of automatic control. As this technique is the same as that commonly done in the prior art, it will not be described in detail herein.

(2) Potentiostatic type alloy plating control system

Figure 7:
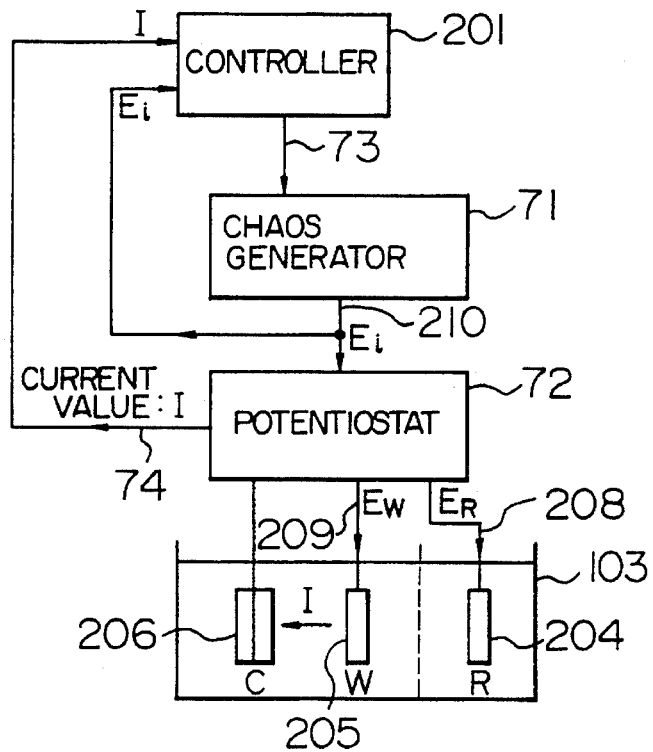
FIG. 7 shows the structure of another embodiment of the present invention applied to the control of a potentiostatic type alloy plating system in which the working electrode potential is monitored.

FIG. 7 shows the structure of a potentiostatic type alloy plating control system which is another embodiment of the present invention. The potentiostatic alloy plating control system shown in FIG. 7 does not appreciably differ from the galvanostatic alloy plating control system described already, except that a chaos generator 71 is provided, and the galvanostat 202 is replaced by a potentiostat 72, because the potential is directly controlled in this potentiostatic type. The chaos generator 71 generates a chaotically varying potential. This chaos generator 71 may be hardware, such as, an electronic circuit, or software, such as, that used in a microcomputer. In the system, a chaotic progression is generated according to a map $E_i = p \cdot E_{i-1}[1-E_{i-1}]$, and the potential obtained as a result of conversion of the scale in relation to the metal deposition range is newly selected as $E_i$ which is supplied to the potentiostat 72. This potential value is maintained until the next potential $E_{i+1}$ is supplied. During this time, the potential E of the working electrode 205 relative to the reference potential of the reference electrode 204 is maintained at $E_i$. This potential $E_i$ corresponds to the potential $E_i$ discretized on the Poincaré surface of section in FIG. 2. The parameter p is a control parameter 73. Therefore, the controlled system is the chaos generator 71 followed by the potentiostat 72 and the electrolytic vessel 103. The chaos is generated at the value of the parameter p=3.87, and the parameter p is adjusted in arrange $I_p$=[3.84, 3.89]. The control algorithm is similar to that referred to in FIG. 3. However, in the illustrated system, the map according to the rule of dynamics of the system is already known. Therefore, this map can be used in the step 306 of prediction by the prediction means. Also, because the chaos generator 71 generates the discrete chaotic progression, the step 302 of sampling by the discretizing means is unnecessary. For example, by stabilization of a period 1 state (a fixed point), an alloy layer having a uniform component ratio distribution in the thicknesswise direction can be deposited. The thickness of the alloy layer is controlled by monitoring the integrated value of the current I(74).

Figure 8A:
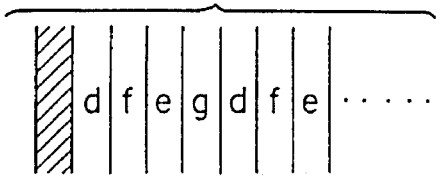
FIG. 8A shows a schematic section of the plated alloy layers and FIG. 8B shows the corresponding potential variations observed during the alloy layer plating.
Figure 8B:
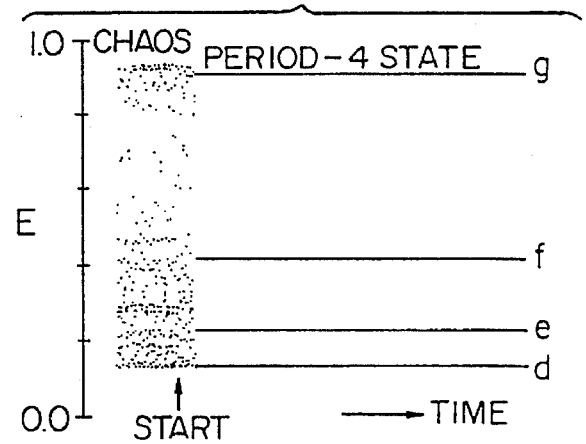

FIGS. 8A–8B show the result of deposition of a plated layer of a Cu-Ag alloy by controlling the plating process to a period-4 state. FIG. 8A shows a schematic structure of the deposited alloy layer. The hatching in FIG. 8A corresponds to the transient state in converting the chaotic state to the periodic state. The thickness of this hatching part was so small that it was actually negligible. FIG. 8B shows the variation of the discrete potential $E_i$. The time interval of the generation of chaotic time series from the chaos generator 71 was 5 sec. In (2) of FIG. 8B, one point corresponds to one discrete potential. In the period-4 state, the points are very closely distributed, and it is unable to distinguish one point from another. The arrow in FIG. 8B indicates the onset of the control. The point where the target is attained is the onset of the period-4 state, and this point can be clearly identified. It will be seen that uniform layers having different components ratios (d, e, f, g) are alternately laminated.

Figure 9:
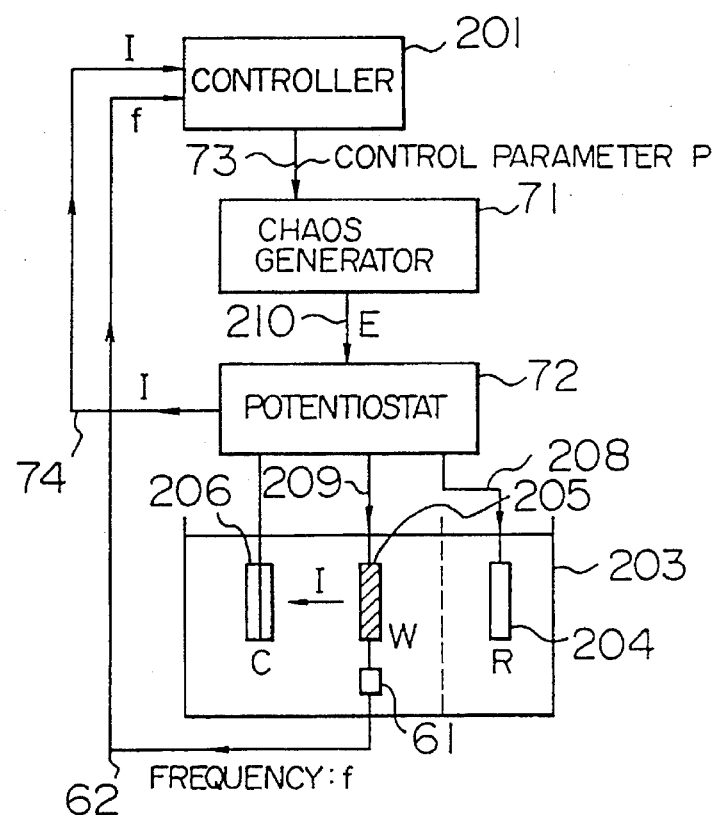
FIG. 9 shows the structure of another embodiment of the present invention applied to the control of a potentiostatic type alloy plating system in which the signal from a crystal oscillator is monitored.

In this embodiment too, a crystal oscillator sensor may be provided to monitor the frequency without directly monitoring the potential. FIG. 9 shows the structure of such a modification. The structure shown in FIG. 9 is the same as that of the galvanostatic type shown in FIG. 6. The control algorithm is also the same as that referred to in FIG. 3. However, as in the case of FIG. 7, the step 302 using the discretizing means is unnecessary. In the modification shown in FIG. 9, a neural network was used for the prediction, and the effectiveness of the prediction was ascertained. More precisely, a neural network of 4-4-1 type was used, and learning according to back propagation was resorted to. The past data used in this case are those at 2,000 points for each of three parameter values p=3.84, p=3.87 and p=3.89.

In the case of the potentiostatic type, the chaos generator 71 generating the discrete chaotic progression was used by way of example. It is needless to mention that the chaos generator 71 generating a continuous chaotic progression can also be practically used. However, in such a case, the step 302 using the discretizing means cannot be eliminated in the control algorithm referred to in FIG. 3.

Another embodiment of the control system of the present invention when applied to the deposition of thin films made of a multi-component materials will now be described.

Figure 10:
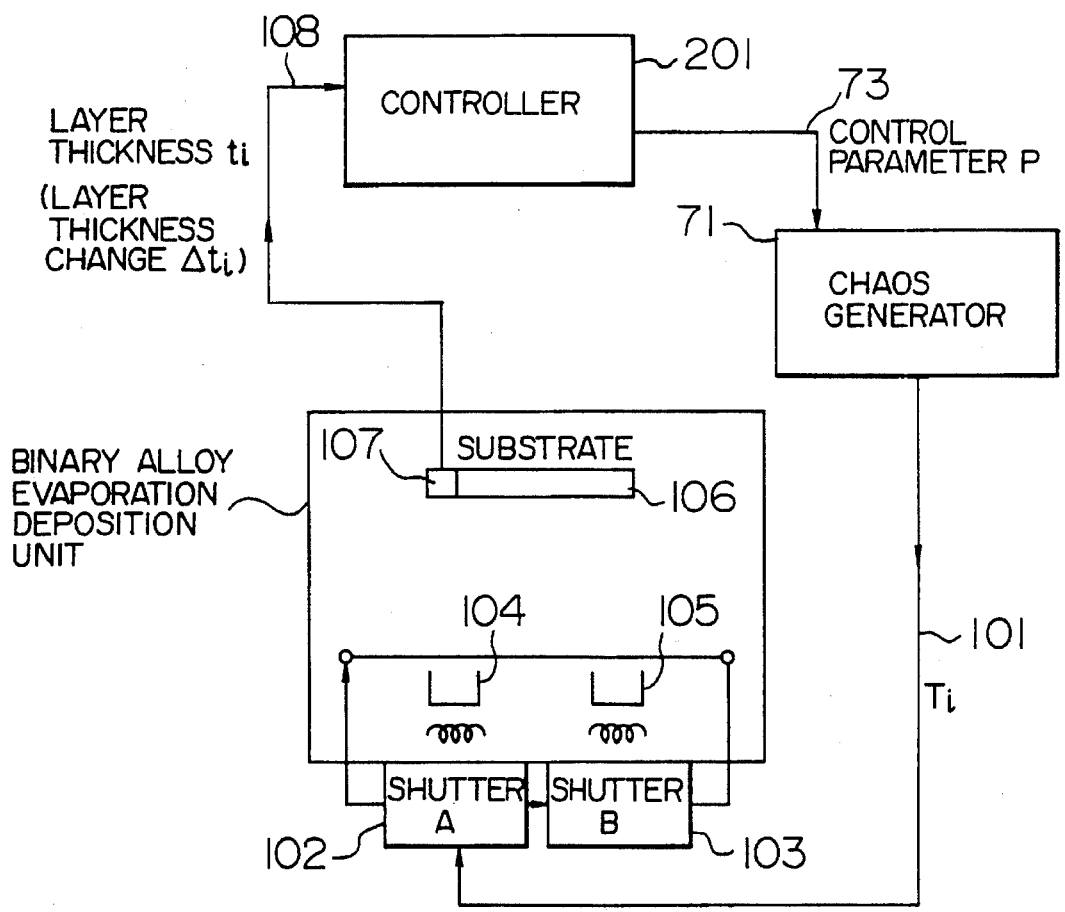
FIG. 10 shows the structure of another embodiment of the present invention applied to the control of an apparatus for forming a multilayer of a binary alloy by evaporation.

FIG. 10 shows an application of the present invention applied to an apparatus for making an alloy layer of multi-layer structure by evaporation of a binary alloy. Referring to FIG. 10, durations of opening and closing shutters A(102) and B(103) associated with sources of evaporation materials A(104) and B(105) respectively are determined according to chaotic progression train $T_i$(101) generated from the chaos generator 71. In this embodiment, the shutter B(103) is kept closed while the shutter A(102) is kept open, and, conversely when the shutter A is kept closed, the shutter B is kept open. In this manner, evaporation of the materials A(104) and B(105) onto a substrate 106 is controlled. The target of control is the thickness of each of the evaporated layers. Oddly numbered terms of the chaotic progression $T_i$ indicates the duration of opening the shutter A, while the evenly numbered term of the chaotic progression $T_i$ indicates the duration of closing the shutter A.

Therefore, in order to make a multilayer type alloy layer of a binary alloy having a periodic structure, it is necessary to utilize a higher period state than the period-2 state. In this case, the chaos generator 71 is controlled. A film thickness meter 107 disposed near the substrate 106 generates an output signal representing the layer thickness $t_i$(108) which is monitored. The control algorithm in this case is also similar to that referred to in FIG. 3. A change $\Delta t_i (= \Delta t_i - t_{i-1})$ of the layer thickness $t_i$ corresponds to the discrete potential $E_i$. Accordingly, the step 302 using the discrete means is unnecessary.

Figure 11A:
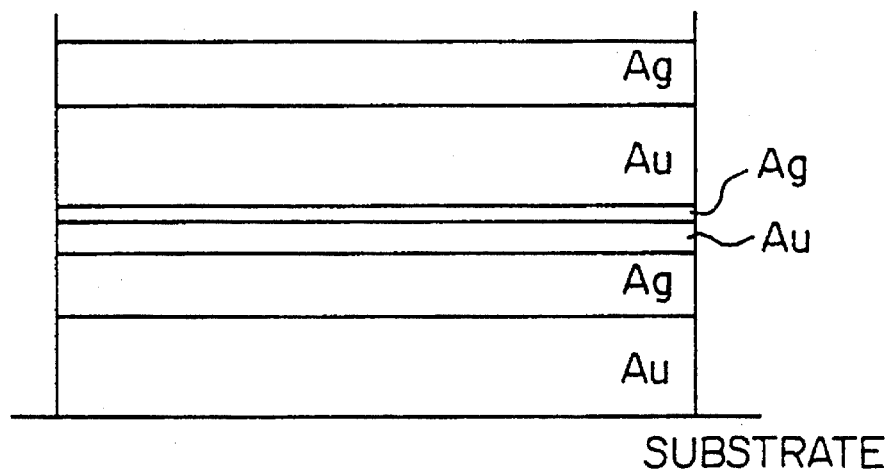
FIG. 11A shows a schematic section of the evaporated multilayer and FIG. 11B shows the sequence of opening and closing the shutters during the evaporation process.
Figure 11B:
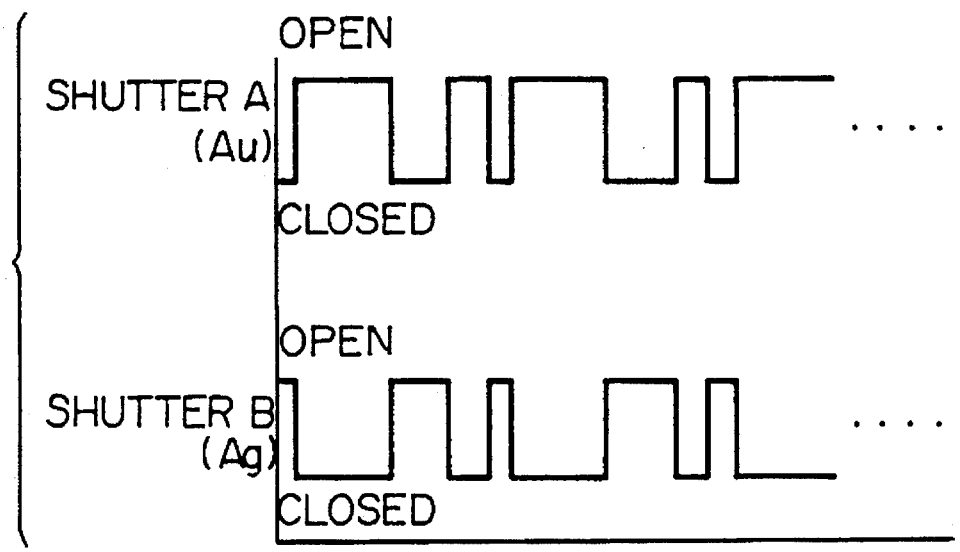

FIGS. 11A–11E show the result of application of the present invention to the deposition of a multilayer type alloy layer of an Au-Ag alloy. The stable transition from the chaotic state to the period-4 state is utilized to alternately laminate layers of Au and Ag. FIGS. 11A–11B show the structure of the multilayer type alloy layer and the sequence of opening and closing the shutters A and B respectively. It will be seen that the desired periodic structure can be formed.

Figure 12:
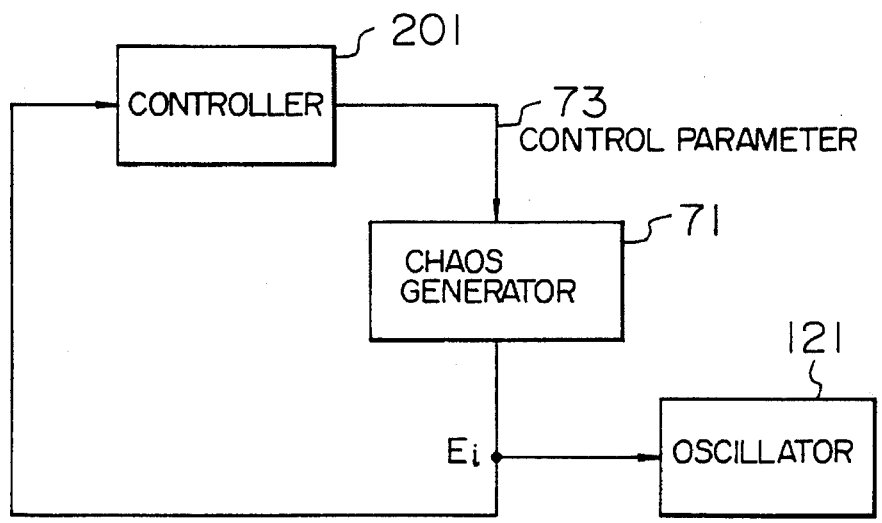
FIG. 12 shows the structure of another embodiment of the present invention applied to the control of a pacemaker.

FIG. 12 shows another embodiment of the control system of the present invention applied to a heart pacemaker. The chaos generator 71 is provided to act as an oscillator in the pacemaker. The chaos generator 71 is composed of chaos devices. An example of such a chaos device is described in, for example, a book entitled "Chaos" edited by Kazuyuki Aihara.

In this case too, the control of converting the chaotic state to the periodic state is utilized. The heart beat rate of a patient can be controlled over six stages by merely slightly changing the parameter for the purpose of maintaining the heart beat rate. That is, when the patient lies quietly, a high periodic state, for example, the periodic state 15 is selected, while when the heart beat rate is high, a periodic state, for example, the periodic state 10 to 14 is selected. When the heart beat rate of 60 beats/min is selected when the patient lies quietly, the heart beat between 60 beats/min and 90 beats/min could be adjusted over six stages (60, 65, 69, 75, 82, 90). The chaos train generated at an equal time interval from the chaotic progression 71 is controlled so that a pulse coinciding with a maximum value in a periodic state is outputted. For example, in the periodic state of 15, fifteen discrete values are provided. The signal coinciding with the maximum value of the fifteen discrete values is applied to an oscillator 121, and the oscillator 121 generates its output pulse with the signal application timing. This output pulse acts to activate the heart pacemaker.

It is already known that the heart beat of a healthy person free from any cardiovascular disease makes a chaotic variation. Thus, when an oscillator device that can reproduce this chaos is used, the pacemaker can operate with natural fluctuation even in the state of off-control or in the transient state after the pace change-over. Also, a self-controlled pacemaker can be provided when it is combined with sensing functions for sensing the quantity of sweating, the oxygen concentration in the blood, etc.

It will be seen from the foregoing description of preferred representative embodiments that how the control system according to the present invention can effectively function. However, when the value of n becomes very large in the SOGY algorithm, there may arise such a possibility that the effectiveness of the SOGY algorithm cannot be guaranteed. This is probably attributable to a prediction error. In regard to how to secure the effectiveness of the SOGY algorithm itself, there are a plurality of solutions as will be described now besides an improvement in the method of prediction described already, and it was ascertained that any of these solutions was effective.

1) A limit of the value of n is set, and when the value of n exceeds the limit, the control is continued by maintaining the parameter at its present value (the nominal value) and selecting the value of n as n=1.

2) An uncertainty $\Delta(k)$ is estimated for each step k, and the SOGY algorithm is activated to work by the use of $I_t(k)$ $(=[E_{min}+\Delta(k), E_{max}-\Delta(k)])$ in lieu of $I_t$ $(=[E_{min}, E_{max}])$. When the result provides $I_t(k)$–null set, the control is continued by maintaining the parameter at the present value (the nominal value) and electing the value of n as n=1.

3) The region $I_p$ itself is selected as wide as possible so as to prevent the value of n from becoming so large. In such a case, however, there arises the possibility that the linearity of the map F relative to the parameter p may be lost. Though the OGY algorithm is based on the assumption of the linear dependence of the map F on the parameter, the algorithm can be extended when the map F is one-dimensional. That is, an equation of higher degree is solved in this case in lieu of solving the linear equation for p given in the papers cited already. Thus, no change is required for the part of the SOGY algorithm.

It will thus be understood that the control system according to the present invention can quickly and accurately control the conversion the chaotic state to any one of various periodic states and can stably maintain the periodic state.

We claim:

1. A control system comprising:

a stabilizing algorithm means for stabilizing a target system in a chaotic state into a periodic state;

an accelerating algorithm means for directing the target system rapidly to a region on a chaotic attractor; and a predicting means for predicting a following variation of data originating from the target system based on a previous observation of corresponding data, wherein a determination of a current state of the target system is determined based on observation of data originating from the target system, thereafter said stabilizing algorithm means is employed in a case where the stabilizing algorithm means is considered to be effective taking a result of the determination into account, otherwise prediction of following states of the target system are predicted by said predicting means, and said accelerating algorithm means is operated using results of the prediction to make a state of the target system a periodic state.

2. A control system comprising:

a stabilizing algorithm means for stabilizing a target system in a chaotic state into a periodic state;

an accelerating algorithm means for directing the target system rapidly to a region on a chaotic attractor; and a predicting means for predicting a following variation of data originating from the target system based on a previous observation of corresponding data, wherein a determination of a current state of the target system is determined based on observation of data originating from the target system, thereafter said stabilizing algorithm means is employed in a case where the stabilizing algorithm means is considered to be effective taking a result of the determination into account, otherwise prediction of following states of the target system corresponding to a range of an adjustable control parameter are predicted as a region of a state space by said predicting means, and said accelerating algorithm means is operated to make the state of the target system a periodic state by adjusting a control parameter so that a following state is included in an overlap between a predicted region and a region where said stabilizing algorithm means is effective.

3. A control system comprising:

a stabilizing algorithm means for stabilizing a target system in a chaotic state into a periodic state;

an accelerating algorithm means for directing the target system rapidly to a region on a chaotic attractor; and a predicting means for predicting following states of the target system based on a previous observation of corresponding data by using time delay coordinates and a weight being decreased exponentially with an oldness of the data, wherein a determination of a current state of the target system is determined based on observation of data originating from the target system, thereafter said stabilizing algorithm means is employed in a case where the stabilizing algorithm means is considered to be effective taking a result of the determination into account, otherwise prediction of following states of the target system are predicted by said predicting means, and said accelerating algorithm means is operated using results of the prediction to make a state of the target system a periodic state.

4. A control system according to claim 1, wherein said predicting means predicts the following states of the target system corresponding to a range of an adjustable control parameter as a region of a state space.

5. A control system according to claim 3, wherein said predicting means predicts the following states of the target system corresponding to a range of an adjustable control parameter as a region of a state space.

6. A control system according to claim 1, wherein said predicting means predicts a following state by using time delay coordinates and a weight being decreased exponentially with an oldness of the data.

7. A control system according to claim 2, wherein said predicting means predicts a following state by using time delay coordinates and a weight being decreased exponentially with an oldness of the data.

8. A control system according to claim 1, wherein said predicting means carries out discretization by a Poincaré surface of section in observing the state of the target system, and processes a time series discretized which is regarded as a variation of the state of the target system.

9. A control system according to claim 2, wherein said predicting means carries out discretization by using a Poincaré surface of section in observing the state of the target system, and processes a discretized time series which is regarded as a variation of the state of the target system.

10. A control system according to claim 3, wherein said predicting means carries out discretization by using a Poincaré surface of section in observing the state of the target system, and processes a discretized time series which is regarded as a variation of the state of the target system.

11. A control system according to claim 1, wherein said predicting means evaluates an accuracy of the prediction itself to apply an evaluation to the result of the prediction.

12. A control system according to claim 2, wherein said predicting means evaluates an accuracy of the prediction and performs the prediction taking the result.

13. A control system according to claim 3, wherein said predicting means evaluates said accuracy of the prediction and performs the prediction taking the result of the evaluation into account.

14. A control system according to claim 1, wherein said predicting means uses time delay coordinates.

15. A control system according to claim 2, wherein said predicting means uses time delay coordinates.

16. A control system according to claim 1, wherein said predicting means includes a local approximation model of zeroth order and first order which is non-parametric.

17. A control system according to claim 2, wherein said predicting means includes a local approximation model of zeroth order first order which is non-parametric.

18. A control system according to claim 3, wherein said predicting means includes a local approximation model of zeroth order first order which is non-parametric.

19. A control system according to claim 1, wherein said predicting means includes one of a global approximation model and a local approximation model which are parametric.

20. A control system according to claim 2, wherein said predicting means includes one of a global approximation model and a local approximation model which are parametric.

21. A control system according to claim 3, wherein said predicting means includes one of a global approximation model and a local approximation model which are parametric.

22. A control system according to claim 1, wherein said predicting means includes a neural network model.

23. A control system according to claim 2, wherein said predicting means includes a neural network model.

24. A control system according to claim 3, wherein said predicting means includes a neural network model.

* * * * *